Figure 2:
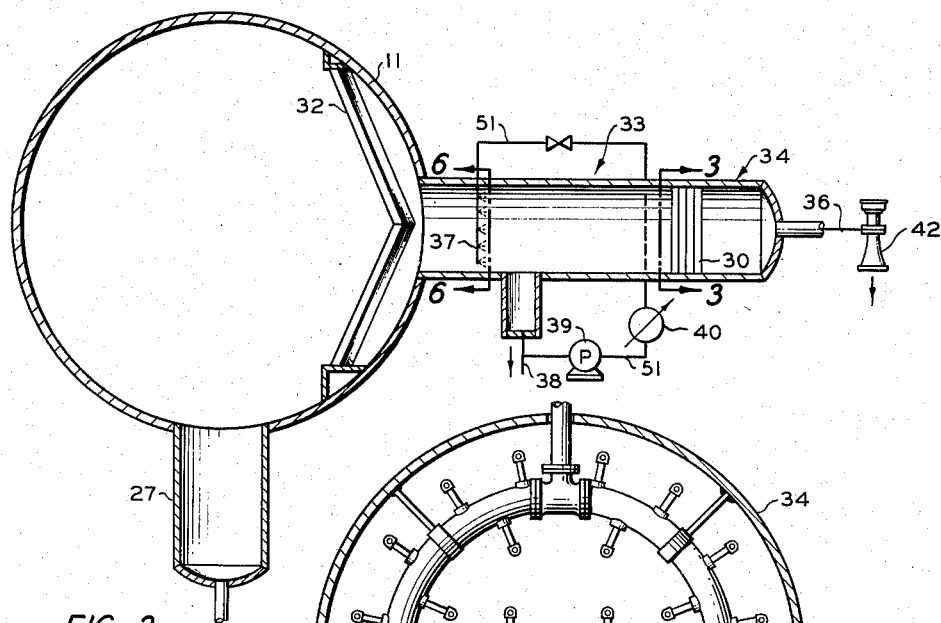

Aug. 25, 1959    P. M. WADDILL ET AL    2,901,426
VAPORIZATION WITH CONDENSATION OF VAPORS AND RECOVERY
OF RESULTING CONDENSATE IN AN EXTERNAL GUARD ZONE
Filed Dec. 28, 1953    2 Sheets-Sheet 1

INVENTORS
P. M. WADDILL
W. E. BARR
BY
Hudson & Young
ATTORNEYS

Aug. 25, 1959 P. M. WADDILL ET AL 2,901,426
VAPORIZATION WITH CONDENSATION OF VAPORS AND RECOVERY
OF RESULTING CONDENSATE IN AN EXTERNAL GUARD ZONE
Filed Dec. 28, 1953 2 Sheets-Sheet 2

INVENTORS
P.M. WADDILL
W. E. BARR
BY
Hudson & Young
ATTORNEYS

United States Patent Office 2,901,426
Patented Aug. 25, 1959

2,901,426

VAPORIZATION WITH CONDENSATION OF VAPORS AND RECOVERY OF RESULTING CONDENSATE IN AN EXTERNAL GUARD ZONE

Paul M. Waddill, Bartlesville, Okla., and William E. Barr, Phillips, Tex., assignors to Phillips Petroleum Company, a corporation of Delaware Application December 28, 1953, Serial No. 400,526

16 Claims. (Cl. 208—355)

This invention relates to process and apparatus for the condensation of vapors and to the recovery of resulting condensate. In one aspect this invention relates to the distillation of a distillable material under high vacuum. In another aspect this invention relates to process and apparatus, wherein residual vapors from vacuum distillation of a distillable material and subsequent condensation of vaporous distillation product, are further condensed, and resulting condensate is recovered so as to prevent flow of such residual vapors and resulting condensate to the vacuum producing means, thereby preventing impairment of the efficiency of the vacuum producing means that would otherwise result from the load imposed upon it by the said residual vapors.

In accordance with this invention, we have provided for the removal of entrainment only from vapors, and for the condensation of vapors and recovery of resulting condensate, together with any said entrainment, by contacting the vapor with a liquid spray, preferably in heat exchange relation and more preferably in concurrent flow heat exchange relation with a relatively cold liquid spray; and passing any droplets of spray and/or condensate, not settled in the contacting zone, through a liquid droplet deflecting surface, or baffle, so as to intercept the flow of the said droplets and cause them to settle so as to permit their separation from any remaining residual vapor. In accordance with a narrower concept, this invention provides for distillation of a distillable material under high vacuum, wherein such a material is flash vaporized and resulting vapors are then substantially completely condensed, or partially condensed to form one or more selected distillate fractions, followed by substantially completely condensing remaining vapors, and for then passing any remaining uncondensed vapor in concurrent flow heat exchange relation with a relatively cold spray of liquid; and passing any droplets of spray into a condensate not settled in the spray contacting zone, through a liquid droplet deflecting surface or baffle so as to intercept the flow of the said droplets to cause them to settle, thereby providing for condensation of uncondensed vapor from the initial distillation and condensing zone and for recovery of resulting condensate so as to prevent the otherwise uncondensed vapor from reaching the vacuum producing means and impairing efficiency of the latter by the additional load imposed. In accordance with one concept of apparatus in which vapors from any one source, as for example the uncondensed vapors from distillation and condensation above-described, are further condensed, apparatus is provided comprising a chamber external to the source of said vapors, such as a distillation vessel in which distillation and subsequent condensation of vapors is conducted, a first conduit in a side wall of the said chamber for admitting vapor, a second conduit in a side wall of the chamber for withdrawal of any residual vapor, a spray nozzle assembly in the chamber adapted to emit spray toward the said second conduit, conduit means for admitting liquid to said spray nozzle assembly and conduit means for withdrawing liquid from said chamber; a baffle section in said chamber intermediate said spray assembly and said second conduit, and transversely closing said chamber and functioning as a liquid droplet deflecting surface, to prevent flow of any droplets to the said second conduit. The latter feature is necessary when liquid droplets present in the chamber ordinarily reach the said second conduit and is of particular importance when the said second conduit is in direct communication with a vacuum producing means, i.e., it prevents flow of liquid drops to the vacuum producing means. When operating under conditions whereby liquid droplets never reach the said second conduit, the said baffle or deflecting surface can ordinarily be dispensed with.

Figure 6:
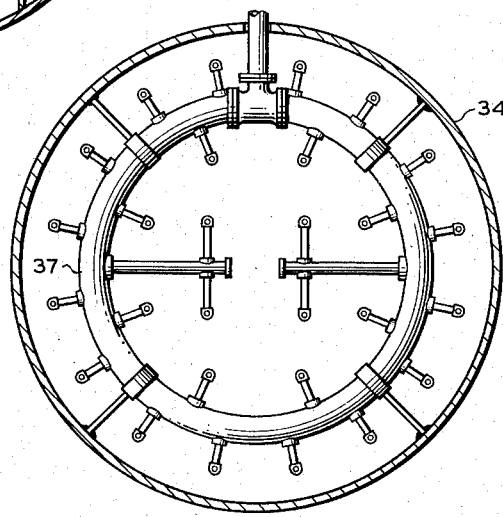
Figure 1:
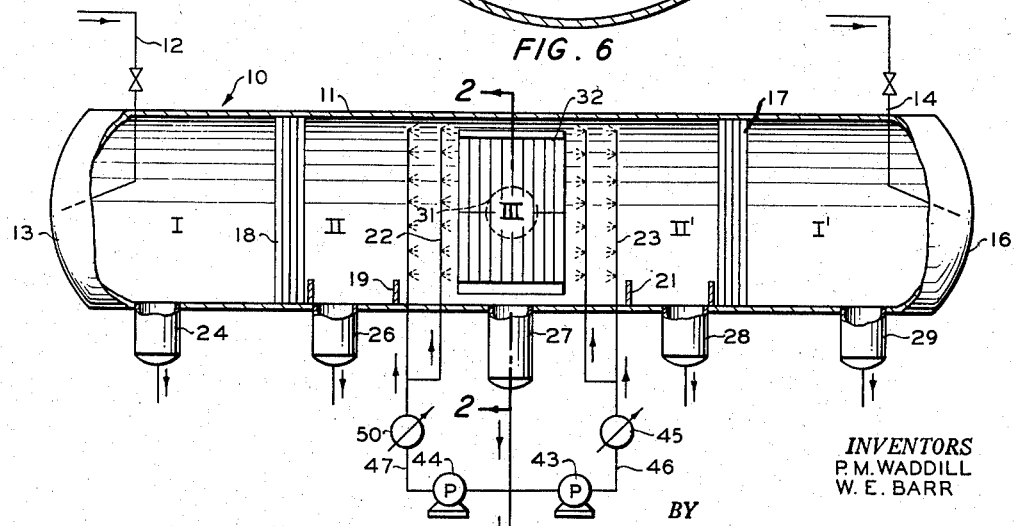
Figure 3:
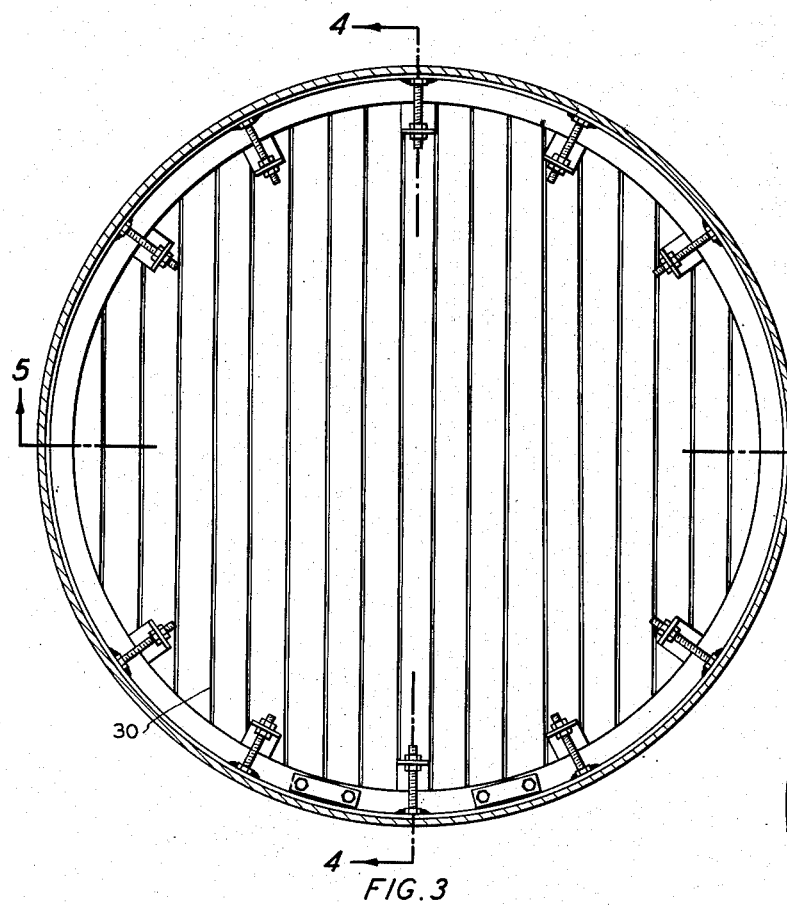
Figure 4:
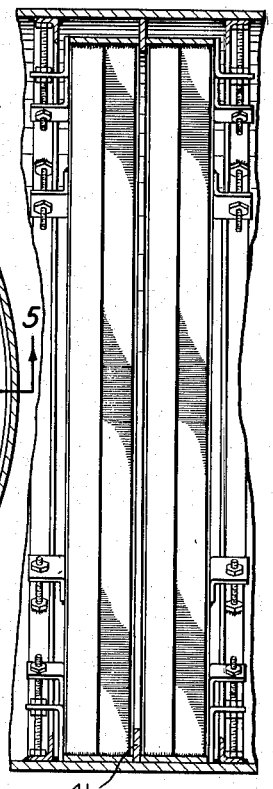
Figure 5:
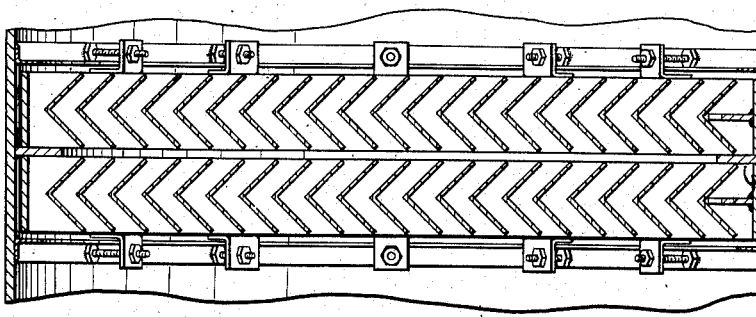

Reference is made to the attached diagrammatic drawings, which are illustrative of our invention. Figure 1 is a schematic showing of distillation apparatus and process to which our invention is advantageously applied. Figure 2, a cross-sectional view taken along the line 2—2 of Figure 1, shows a vapor condensing and condensate recovery chamber of our invention, applied as a guard chamber in conjunction with the distillation system of Figure 1. Figure 3 is an elevation of a preferred baffle section employed in the vapor condensation and condensate recovery of our invention taken along the line 3—3 of Figure 2. Figure 4 is a side elevation of the baffle structure of Figure 3 taken along the line 4—4 of Figure 3. Figure 5 is a plan view of the baffle structure of Figure 3 taken along the line 5—5 of Figure 3. Figure 6 is a cross-sectional view of a preferred arrangement of sprays employed in our apparatus of Figure 2 and is taken along the line 6—6 of Figure 2. Spray nozzle assemblies and baffle sections in apparatus of Figure 1 can advantageously be the same as those specifically illustrated with reference to Figure 2.

With reference to Figure 1, distillation chamber 10, comprises a closed substantially horizontally disposed shell 11, preferably cylindrical; feed inlet conduit 12 extending into shell end section I, preferably terminating toward shell end 13; feed inlet conduit 14 extending into shell end section I', preferably terminating toward shell end 16; baffle section 17, transversely closing shell 11 and forming shell section I' with end 16; baffle section 18 transversely closing shell 11 and forming section I with end 13; dam rings 19 and 21, each circumferentially disposed about the inner wall of shell 11 and forming with baffles 18 and 17, the shell sections II and II', respectively, and together forming shell section III, the latter the central section of shell 11; spray nozzle assemblies 22 and 23 each adapted to emit spray in a direction concurrent with vapor flow from sections II and II', respectively; conduit outlets 24, 26, 27, 28 and 29, for withdrawing liquid from each of sections I, II, III, II' and I', respectively; and outlet conduit 31 in a side wall of shell 11, the latter conduit being in direct communication with the interior of shell section III.

With reference to Figure 2, baffle 32 in shell 11 is disposed across outlet conduit 31 as a liquid droplet deflector, so as to deflect entrained liquid droplets to thereby prevent their flight into chamber 33, described hereinafter. Chamber 33 is a vapor condensation and condensate recovery chamber of our invention, comprising a closed elongated shell 34, preferably cylindrical, connected via inlet conduit 31 in communication with the interior of shell 11, intermediate spray nozzles 22 and 23; an outlet conduit in a downstream end of shell 34, i.e., spaced away from inlet conduit 31; a spray nozzle assembly 37, intermediate conduits 31 and 36 and adapted to emit spray toward conduit 36, or if preferred, to emit spray in a transverse direction in shell 34; baffle section 30 transversely closing shell 34 and disposed intermediate nozzle assembly 37 and conduit 36; outlet conduit 38 for withdrawal of liquid from shell 34 and pump 39, conduit 51 and cooler 40, in conduit 51, for recycling at least a portion of liquid in line 38 to spray nozzle assembly 37; and stream jet vacuum producing means 42 connected with shell 11 via conduit 36, chamber 33 and conduit 31.

As illustrated with reference to Figures 3, 4 and 5, baffle section 30, in a preferred form, comprises a plurality of parallel courses of angle irons, each said course substantially closing shell 34, angle irons in each of these courses, facing a common direction transversely across chamber 34 and each angle in each course having its vertex positioned within the sides of the adjacent and preceding angle. Dam ring 41 (Figures 4 and 5) serves as a partial support for the angle iron baffle section 30 and also serves to prevent flow of settled liquid beyond baffle 30, to thereby facilitate withdrawal of liquid from shell 34. Baffle 30, whether of the preferred design or of another design, functions as a deflecting surface, i.e., provides for a tortuous path therethrough, whereby only vapors are passed through that baffle section, if present, and liquid droplets being unable to follow the said tortuous path are deflected and caused to settle in shell 34 for withdrawal via conduit 38.

Figure 6 shows a preferred arrangement of spray nozzles 37, by means of which liquid spray is dispersed uniformly in contact with flow of vapors. The specific form of nozzle assembly illustrated is a preferred form, it being important, in any event, that the selected nozzle assembly be such that uniform contact of spray and vapor is achieved.

Again referring to Figures 1 and 2, our invention is illustrated with reference to its application to the distillation of a distillable liquid, by which term it is meant to include any distillable material such as for example vegetable, animal and mineral oils, distillable organic and inorganic chemical mixtures or solutions, and juices, such as in the low temperature flash distillation of water from fruit and vegetable juices; the distillation system specifically illustrated has especial utility as applied to the distillation of residual hydrocarbon oils, such as reduced crude, fuel oil, cracking still residue, cylinder stock, cracked topped crude, or the like, such as a residuum from topped crude cracking having a gravity within the limits of —5 to 5° API and a viscosity at 210° F., generally above 20 SFS. Distillation chamber 10 is maintained under a pressure of from about 0.01 to 10 mm. Hg absolute by vacuum producing means 42. Preheated feed, such as a residual hydrocarbon oil at 600–900° F. is introduced into the section I of chamber 10 via conduit 12 under which conditions it is partially flashed. Vapor containing entrained liquid droplets is passed through baffle 18 and section II, under which conditions some entrainment, i.e. entrained droplets, settles in section II. Another stream of the preheated feed is introduced into section I' of chamber 10 and partially flash vaporized. Vapor containing entrained liquid is passed from section I' through baffle section 17, and section II', under which conditions some entrainment settles in section II'. A major proportion of unvaporized liquid from the initial flashing in sections I and I' settles in those sections. Vapors from sections II' and II each pass in concurrent flow heat exchange relation with relatively cold liquid from sprays 23 and 22, respectively, in section III, to substantially completely condense these vapors. Liquid product is withdrawn from each of the sections I, II, III, II' and I' via outlet conduits 24, 26, 27, 28 and 29, respectively. Liquid is withdrawn from conduit 27 via pumps 43 and 44 and conduits 46 and 47, respectively, for recycle as cool liquid feed via coolers 45 and 50, respectively, to spray nozzles 23 and 22.

The efficiency of vacuum distillation in chamber 10 is dependent upon the degree of high vacuum attained, high vacuum being provided by virtue of the baffle system and spray technique employed, i.e., the use of only two spray nozzle assemblies and two baffle sections to provide extremely low pressure drop across chamber 10, particularly in view of the concurrent flow relation of vapors with sprayed droplets therein. It is, therefore, important in order to maintain such low operating pressures, that vapors in section III are substantially completely condensed. However, in view of normal fluctuation in operation, some vapors remain uncondensed in section III, either due to insufficiently low spray temperature at any given interval, or momentarily inadequate spray rate, momentary increase in feed rate, or the like. However, even under the most favorable conditions some vapors may be expected to leave chamber 10 via line 31, although at times probably not more than trace quantities. In any event, the vapor condensing and condensate recovery chamber of our invention prevents any vapors, leaving chamber 10, from reaching vacuum jets 42, and thereby prevents impairment of the efficiency of vacuum jets 42 by the otherwise presence of vapors alone or containing entrained liquid. Thus, vapors leaving chamber 10 via line 31 are contacted with relatively cold spray from nozzle assembly 37, cooled to a temperature generally of from 20 to 500° F. below that of vapors contacted therewith, via cooling means 40 in line 51, so as to condense the said vapors and to recover condensate thus formed, thereby preventing flow of such vapors to the vacuum jets. Spray in chamber 33 is preferably emitted in a direction concurrent with that of vapors contacted therewith although emission of spray in a transverse direction can be employed if desired. The concurrent flow relation of spray with vapors is advantageous over other spray-vapor contacting arrangements, due to the lower pressure drop achieved as a result of sprayed droplets and vapors flowing in a common direction toward vacuum jet source (line 36). Substantially complete condensation of vapor from line 31 is achieved in chamber 33. Condensate formed in chamber 33 and sprayed droplets therein, not settled subsequent to the spray-vapor contact, are passed against baffle section 30 and are deflected, and thereby prevented from reaching the vacuum jet system 42. Deflected droplets are settled in chamber 33 and withdrawn with previously settled liquid, via line 38.

In the event that all condensate and sprayed droplets can be settled in chamber 33 by force of gravity alone, use of baffle section 30 can be dispensed with. However, complete settling by gravity is seldom achieved and use of baffle section 30 as a "deflecting" surface is generally essential.

Although utility of our invention has been illustrated by way of its application to the distillation of a distillable liquid, e.g., a residual hydrocarbon oil, it is to be understood that it can be applied to any utilization requiring condensation of vapors and recovery of resulting condensate, such as in the removal of specific components from a gas stream, i.e., by partial condensation. Thus, in some embodiments of our invention, a residual gas stream withdrawn via line 36 may be the chief product and operation may be at a pressure of atmospheric or higher. Our invention can also be applied to the removal of entrained material from gases containing same, i.e., by contacting the material with spray at about the temperature of the said material, under conditions causing sprayed droplets to collide and coalesce with entrained particles and then settling the resulting particles and droplets to provide residue substantially free from entrainment. In this latter embodiment, it may be advantageous to maintain the spray temperature, slightly above the temperature of vapors contacted therewith so that entrainment is removed without there being condensation of vapors taking place. When employing spray temperatures lower than those of vapors contacted therewith in chamber 33, removal of any entrained liquid from vapors, as result of the spray-vapor contacting, occurs inherently.

Vacuum distillation of distillable materials in accordance with apparatus and process relating to the presently disclosed distillation system embodying vapor spray contacting to remove entrainment from vapors, and to effect partial and/or substantially complete condensation of vapors are disclosed and claimed in the U. S. application of Victor C. Cavin, Warren H. Acker, and Paul M. Waddill, Serial No. 188,604, filed October 5, 1950, now abandoned; in the copending application of Paul M. Waddill, Serial No. 241,183, field August 10, 1951; now abandoned in the copending application of Victor C. Cavin, Warren H. Acker, and Paul M. Waddill, Serial No. 343,560, filed March 20, 1953, now U.S. Patent No. 2,805,981 as a continuation-in-part of the said Serial No. 188,604, and application Serial No. 400,450 December 28, 1953, the latter a continuation-in-part of application Serial No. 241,183, filed August 10, 1951, now abandoned.

Reasonable variation and modification are possible within the scope of the foregoing disclosure and drawings and appended claims to the invention, the essence of which is apparatus and method for the removal of entrainment from, or condensation of vapors such as uncondensed vapors from a vapor condensing zone of a distillation system, and for the recovery of resulting entrainment or entrainment together with condensate; one method concept comprising contacting the said vapors, preferably in heat exchange relation and more preferably in concurrent flow heat exchange relation with a relatively cold liquid spray, and passing any droplets of spray and/or condensate not settled in the contacting zone against a liquid droplet deflecting surface, or baffle section, so as to intercept their linear flow and cause them to settle from any remaining residual vapors, for recovery; an apparatus concept comprising a chamber, a first conduit in a side wall of the said chamber for admitting vapor into the chamber, a second conduit in the chamber side wall for withdrawing any residual vapors therefrom, a spray nozzle assembly intermediate the said first and second conduits and adapted, preferably, to direct spray toward the said second conduit, conduit means for admitting liquid to the said spray nozzle assembly, conduit means for withdrawing liquid from the said chamber, and, when required as a liquid droplet deflector, a baffle section transversely closing said chamber and disposed intermediate the said first and second conduits.

We claim:

1. A process for the vacuum distillation of a distillable material, comprising introducing a stream of such a material into a first end section of an elongated distillation zone under flashing conditions so as to vaporize a portion of same, unvaporized material settling in said first end section; passing a separate stream of such material into a second end section of said distillation zone under flashing conditions so as to vaporize a portion of same, unvaporized material settling in said second end section; passing vapor containing entrained liquid droplets, from said first end section into and through a third and adjacent section toward a central section of said distillation zone, whereby at least a portion of said entrained liquid settles from vapor in said third section; passing vapor containing entrained droplets from said second end section into and through a fourth and adjacent section toward said central section, whereby at least a portion of entrained liquid settles from vapors in said fourth section; passing vapors from said third section into said central section in contact therein with a spray of atomized droplets emitted in a direction concurrently with flow of the last said vapors and maintained at a temperature lower than that of the last said vapors so as to condense at least a portion of same; passing vapors from said fourth section into said central section in contact therein with a spray of atomized droplets emitted in a direction concurrent with flow of the last said vapors and maintained at a temperature lower than that of the last said vapors so as to condense at least a portion of same; recovering liquid from at least one of said sections; passing any uncondensed vapors from said central section to a guard zone external to said distillation zone in contact with a spray of atomized droplets emitted in a direction concurrent with flow of vapors contacted therewith and maintained at a temperature below that of said vapors so as to substantially completely condense same; applying vacuum to said distillation zone at a point in said guard zone downstream from vapor-spray contacting therein; at least a portion of spray and condensate droplets settling in said guard zone; passing any unsettled liquid droplets in said guard zone against a liquid droplet deflecting surface therein, at a point intermediate said vapor-spray contacting and the point of application of said vacuum so as to prevent flow of any residual liquid to said vacuum producing zone; and recovering liquid from said guard zone.

2. The process of claim 1, wherein at least a portion of settled liquid withdrawn from said guard zone is cooled and recycled to said guard zone as said spray therein.

3. The process of claim 1, wherein said distillable liquid is a residual hydrocarbon oil and said spray in said guard zone is maintained at a temperature of from 20 to 500° F. below that of vapors contacted therewith.

4. A vacuum distillation chamber comprising a substantially horizontally disposed closed elongated shell; a first conduit extending into a first end section of said shell; a first baffle section in said shell transversely closing same and terminating said first end section; a second conduit extending into a second end section of said shell; a second baffle section in said shell intermediate said first baffle section and said second conduit, transversely closing said shell and terminating said second section; a first dam comprising a ring intermediate said first baffle and said second baffle circumferentially disposed along the inner wall of said shell; a second dam comprising a ring intermediate said first ring and said second baffle and circumferentially disposed along the inner wall of said shell; a third section in said shell intermediate said first and second dams; a fourth section in said shell intermediate said first dam and said first baffle section; a fifth section in said shell intermediate said second dam and said second baffle section; a third conduit extending into said third shell section; a fourth conduit extending into said third shell section; a first spray means in said third section connected with said third conduit and directed toward said second baffle section; a second spray means in said third shell section intermediate said first spray and said second baffle, connected with said fourth conduit and directed toward said first baffle section; vacuum producing means external to said shell in direct communication with the interior of said third shell section; outlet conduit means in each of said shell sections; a horizontally disposed guard chamber external to said shell; a fifth conduit, in a side wall of said guard chamber, connecting with the interior of said third shell section, intermediate said first and second sprays; a sixth conduit in a side wall of said guard chamber connected with said vacuum producing means; a spray nozzle assembly in said chamber adapted to direct spray toward said sixth conduit and disposed intermediate said fifth and sixth conduits; a third baffle section in said chamber transversely closing same and disposed intermediate said nozzle assembly and said sixth conduit; conduit means for supplying liquid to said nozzle assembly; and liquid outlet conduit means in a side wall of said guard chamber.

5. In apparatus for the vacuum distillation of a distillable material, comprising a distillation chamber and vacuum producing means in communication with the interior of said chamber, the improvement comprising a guard chamber external to said distillation chamber; a first conduit in a side wall of said guard chamber connecting with the interior of said distillation chamber; a second conduit in a side wall of said guard chamber connecting with said vacuum producing means; a spray nozzle assembly in said guard chamber intermediate said first and second conduits adapted to direct spray toward said second conduit; a baffle section in said guard chamber transversely closing same and disposed intermediate said nozzle assembly and said second conduit; conduit means for supplying liquid to said nozzle assembly; and liquid outlet means in a side wall of said guard chamber.

6. Apparatus of claim 5, in which said baffle section comprises a plurality of parallel courses of angle irons, each said course closing said guard chamber, angle irons in all of said courses facing a common transverse direction with respect to said guard chamber, and each iron in each course having its vertex positioned within the sides of an adjacent and preceding angle.

7. A process for vacuum distilling a distillable material which comprises flashing a stream of such a material at one end of elongated distillation zone under flashing conditions so as to vaporize a portion of same, unvaporized material settling in said zone, flashing another stream of a distillable material at the other end of said distillation zone under flashing conditions so as to vaporize a portion of same, unvaporized material settling in said zone, recovering settled liquid from said distillation zone, passing toward each other in said distillation zone vapor streams generated at each end thereof, removing from said distillation zone any uncondensed vapors at the juncture of said streams of vapor, passing said uncondensed vapors removed from said distillation zone to a guard zone external to said distillation zone, contacting said uncondensed vapors in said guard zone with a spray of atomized droplets emitted in a direction concurrent with the flow of vapors contacted therewith so as to substantially completely condense said vapors, thereby substantially improving the efficiency of the vacuum source for said distillation zone by reducing the load on said vacuum source, removing non-condensables from said guard zone and passing same through a vacuum source for said distillation, and recovering settled liquid from said guard zone.

8. A process for vacuum distilling a distillable material which comprises flashing a stream of such a material at one end of an elongated distillation zone under flashing conditions so as to vaporize a portion of same, unvaporized material settling in said zone, flashing another stream of a distillable material at the other end of said distillation zone under flashing conditions so as to vaporize a portion of same, unvaporized material settling in said zone, passing toward each other in said distillation zone vapor streams generated at each end thereof, subjecting said vapor streams to condensing conditions, recovering settled liquid from said distillation zone, removing from said distillation zone any uncondensed vapors at the juncture of said streams of vapor, passing said uncondensed vapors to a guard zone external to said distillation zone, contacting said uncondensed vapors in said guard zone with a spray of atomized droplets emitted in a direction concurrent with the flow of vapors contacted therewith so as to substantially completely condense said vapors, passing any remaining uncondensed vapor through a liquid droplet deflecting zone so as to separate said vapor from any remaining droplets in contact therewith and to cause settling of the last-said droplets, thereby substantially improving the efficiency of the vacuum source for said distillation by reducing the load on said vacuum source, removing non-condensables from said guard zone and passing same through a vacuum source for said distillation, and recovering settled liquid from said guard zone.

9. The process of claim 8 wherein said distillable material is a residual hydrocarbon oil and said spray in said guard zone is maintained at a temperature below that of vapors contacted therewith and wherein at least a portion of settled liquid withdrawn from said guard zone is cooled and recycled to said guard zone as said spray therein.

10. The improvement of claim 8 wherein vapors that have been flash distilled and which are subjected to subsequent condensation conditions in a separate guard zone are passed in said distillation zone in a horizontal direction and wherein said uncondensed vapors are withdrawn from said distillation zone at substantially a right angle to said horizontal vapor flow.

11. A vacuum distillation chamber comprising a closed elongated shell, means extending into one end of said shell for introducing a distillable material under flashing conditions so as to vaporize a portion of said material, means extending into the other end of said shell for introducing a distillable material under flashing conditions so as to vaporize a portion of said material, means for recovering settled liquid from said distillation shell, means for passing the vapors generated at each end of said shell as streams flowing toward each other within said shell, means for removing from said distillation shell any uncondensed vapors at the juncture of said streams of vapor, a guard chamber apparatus comprising an enclosed chamber external to said distillation shell, means extending from the interior of said distillation shell into and communicating with said guard chamber for flowing uncondensed vapors from said shell to said chamber, means extending from the interior of said guard chamber and communicating with a vacuum producing means for said distillation shell so as to flow a non-condensable vapor from said chamber to said vacuum source, spray means disposed intermediate said guard chamber vapor inlet and outlet means adapted to direct spray in a direction substantially concurrent with the normal flow of vapor in said guard chamber so as to substantially completely condense said vapors, means for supplying liquid to said spray means, and means for recovering settled liquid from said guard chamber.

12. A vacuum distillation chamber comprising a closed elongated shell, means extending into one end of said shell for introducing a distillable material under flashing conditions so as to vaporize a portion of said material, means extending into the other end of said shell for introducing a distillable material under flashing conditions so as to vaporize a portion of said material, means for passing the vapors generated at each end of said shell as streams flowing toward each other within said shell, means for removing from said distillation shell any uncondensed vapors at the juncture of said streams of vapor, means for condensing said vapor streams between said ends of said shell and said juncture, means for recovering settled liquid from said distillation shell, a guard chamber apparatus comprising an enclosed chamber external to the said distillation shell, means extending from the interior of said distillation shell into and communicating with said guard chamber for flowing uncondensed vapors from said shell to said chamber, means extending from the interior of said guard chamber and communicating with a vacuum producing means for said distillation shell so as to flow non-condensables from said chamber to said vacuum source, spray means disposed intermediate said guard chamber vapor inlet and outlet means adapted to direct spray in a direction substantially concurrent with the normal flow of vapor in said guard chamber so as to substantially completely condense said vapors, means in said guard chamber transversely closing same and disposed intermediate said spray means and said vapor outlet means so as to separate droplets from any remaining vapors in contact therewith and to cause settling of the last-said droplets, means for supplying liquid to said spray means, and means for recovering settled liquid from said guard chamber.

13. Apparatus according to claim 12 wherein said distillation shell is horizontally disposed and said external guard chamber is positioned at a right angle to said distillation shell.

14. In a process for the vacuum distillation of a distillable material wherein said material is flash distilled and a substantial portion of resulting vapors is condensed and remaining uncondensed vapors are withdrawn from said distillation zone through a vacuum source for said distillation, the improvement comprising contacting said uncondensed vapors in a separate guard zone external to said distillation zone with a spray of atomized droplets emitted in a direction concurrent with the flow of vapors contacted therewith so as to cause sprayed droplets and entrained particles to collide and coalesce and to settle in the zone of said contacting, passing any remaining uncondensed vapor through a liquid droplet deflecting zone so as to separate said vapor from any remaining droplets in contact therewith and to cause settling of the last-said droplets, thereby substantially improving the efficiency of the vacuum producing source for said distillation by reducing the load on said vacuum source, and recovering settled liquid from said guard zone.

15. In a process for the vacuum distillation of a distillable material wherein said material is flash distilled and a substantial portion of resulting vapors is condensed and remaining uncondensed vapors are withdrawn from said distillation zone to a vacuum source for said distillation, the improvement comprising contacting said uncondensed vapors at a point intermediate said distillation zone and said vacuum source in a separate guard zone external to said distillation zone with a spray of atomized droplets emitted in a direction concurrent with the flow of vapors contacted therewith, maintaining said spray at a temperature below that of said vapors so as to substantially completely condense said vapors, thereby substantially improving the efficiency of said vacuum source for said distillation by reducing the load on said vacuum source, removing non-condensables from said guard zone and passing the same through said vacuum source for said distillation, and recovering settled liquid from said guard zone.

16. An apparatus for the vacuum distillation of a distillable material, comprising an elongated distillation shell and vacuum producing means in communication with the interior of said shell, the improvement comprising a guard chamber apparatus comprising an enclosed chamber external to said distillation shell, means extending into said guard chamber from the interior of said distillation shell and communicating with said shell for flowing uncondensed vapors flowing from said shell to said chamber, means extending from the interior of said guard chamber and connecting with said vacuum producing means for flowing non-condensables from said guard chamber to said vacuum producing means, spray means disposed intermediate said guard chamber vapor inlet and outlet means adapted to direct spray in a direction substantially concurrent with the normal flow of vapor in said guard chamber so as to substantially completely condense said vapors, thereby substantially improving the efficiency of said vacuum source for said distillation shell by reducing the load on said vacuum source, means for supplying liquid to said spray means, and means for recovering settled liquid from said guard chamber.

References Cited in the file of this patent

UNITED STATES PATENTS

| | | |
|---|---|---|
| 783,942 | Forbes | Feb. 28, 1905 |
| 907,379 | Laurent | Dec. 22, 1908 |
| 1,919,599 | Schoenberg | July 25, 1933 |
| 1,962,153 | Peterkin | June 12, 1934 |
| 2,003,306 | Perl | June 4, 1935 |
| 2,034,891 | Benz | Mar. 24, 1936 |
| 2,116,144 | Dickinson | May 3, 1938 |
| 2,125,325 | Youker | Aug. 2, 1938 |
| 2,160,103 | Kraft et al. | May 30, 1939 |
| 2,323,047 | Jewell | June 29, 1943 |
| 2,358,559 | Clemens | Sept. 19, 1944 |
| 2,443,970 | Waddill | June 22, 1948 |
| 2,698,282 | Findlay | Dec. 28, 1954 |
| 2,760,918 | Barr | Aug. 28, 1956 |

FOREIGN PATENTS

| | | |
|---|---|---|
| 591,668 | France | Apr. 15, 1925 |